United States Patent
Krishnagi et al.

(10) Patent No.: US 12,204,625 B2
(45) Date of Patent: Jan. 21, 2025

(54) SYSTEM AND METHOD FOR IMPLEMENTING A ONE AUTHORIZATION APPLICATION MODULE

(71) Applicant: JPMorgan Chase Bank, N.A., New York, NY (US)

(72) Inventors: Kumar Rao Krishnagi, Powell, OH (US); Andrea Johnson, Land O Lakes, FL (US); Cristine Santos, New Castle, DE (US); Swathi Govindarao, Hyderabad (IN); Lakshmipavankumar Vegirouthu, Wilmington, DE (US); Deepak Chhabra, Westerville, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 248 days.

(21) Appl. No.: 17/878,380

(22) Filed: Aug. 1, 2022

(65) Prior Publication Data

US 2023/0409683 A1    Dec. 21, 2023

(30) Foreign Application Priority Data

Jun. 17, 2022    (IN) .............................. 202211034729

(51) Int. Cl.
G06F 21/32      (2013.01)
G06K 7/10       (2006.01)

(52) U.S. Cl.
CPC ......... G06F 21/32 (2013.01); G06K 7/10366 (2013.01)

(58) Field of Classification Search
None
See application file for complete search history.

(56) References Cited

U.S. PATENT DOCUMENTS

| | | | | |
|---|---|---|---|---|
| 2013/0214902 | A1* | 8/2013 | Pineau | H04L 63/101 |
| | | | | 340/5.61 |
| 2015/0097030 | A1* | 4/2015 | Gallo | G06K 19/073 |
| | | | | 235/492 |
| 2017/0053142 | A1* | 2/2017 | Gerrity | G06K 7/10366 |
| 2019/0213816 | A1* | 7/2019 | Grigorov | H04N 23/11 |
| 2021/0034933 | A1* | 2/2021 | Abdo | G06K 7/14 |
| 2022/0075861 | A1* | 3/2022 | Nicol, II | G06F 21/32 |

* cited by examiner

Primary Examiner — Jeffrey C Pwu
Assistant Examiner — Mayasa A. Shaawat
(74) Attorney, Agent, or Firm — GREENBLUM & BERNSTEIN, P.L.C.

(57) ABSTRACT

Various methods, apparatuses/systems, and media for accessing a plurality of resources with a single authentication pass are disclosed. A processor successfully allows login a user into an application embedded within a user computing device based on a positive facial recognition result for gaining access to a building; generates, in response to successful login, a quick response (QR) code and a near field communication (NFC) tag; causes a security system installed in an entry point to the building to read the QR code or the NFC tag in response to bringing the user computing device close to the security system; authenticates the user based on successful reading of the QR code or the NFC tag; and configures the QR code or the NFC tag as a single authentication pass allowing the user to enter the building and access the plurality of resources for a predetermined configurable period.

20 Claims, 7 Drawing Sheets

SYSTEM AND METHOD FOR IMPLEMENTING A ONE AUTHORIZATION APPLICATION MODULE

CROSS-REFERENCE TO RELATED APPLICATIONS

This application claims the benefit of priority from Indian Provisional Patent Application No. 202211034729, filed Jun. 17, 2022, which is herein incorporated by reference in its entirety.

TECHNICAL FIELD

This disclosure generally relates to user authentication, and, more particularly, to methods and apparatuses for implementing a platform and language agnostic one authorization application module configured to authenticate users in a secure manner that is reliable, easy to use; and allow authenticated users to access a plurality of resources by a single authentication.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a user may require entering access authorization credentials each time the user wants to gain access to a particular resource among a plurality of resources. For example, an employee of an organization (also referred to as a user) may first scan his/her preauthorized badge to enter the employee's office building. Upon entering the office building, the user may then require entering user's access authorization credential to login to the user's workstation, e.g., laptop, desktop, etc. The user's workstation may be embedded with a plurality of applications that may require entering corresponding access authorization credential each time the user wants to utilize such application. Also, the office building may include a plurality of resource areas such as for printers, fax machines, and other workstations, each having different levels of security access protocols. Thus, each time the user wants to access any of such resources or applications, the user may again be prompted to enter his/her credential to gain access to such resources or applications. During a workday, this may become cumbersome and time consuming for a user because of entering user credentials multiple times, thereby reducing productivity. Conventional tools and method fail to authenticate users in a secure manner that is reliable, easy to use; and also fail to grant authenticated users access a plurality of resources by a single authentication where this type of security protocol is required.

Therefore, there is a need for an advanced tool and method that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic one authorization application module configured to authenticate users in a secure manner that is reliable, easy to use; and allow authenticated users to access a plurality of resources by a single authentication where this type of security protocol is required, but the disclosure is not limited thereto.

According to an aspect of the present disclosure, a method for accessing a plurality of resources with a single authentication pass by utilizing one or more processors along with allocated memory is disclosed. The method may include: accessing an application within a user computing device, the application being configured to authenticate a user based on a facial recognition protocol; successfully logging in the user into the application based on a positive facial recognition result for gaining access to a building; generating, in response to successful login, a quick response code and a near field communication tag; transmitting the quick response code and the near field communication tag to the user computing device; reading the quick response code or the near field communication tag by a security system installed in an entry point to the building in response to bringing the user computing device close to the security system; authenticating the user based on successful reading of the quick response code or the near field communication tag; and configuring the quick response code or the near field communication tag as a single authentication pass allowing the user to enter the building and access the plurality of resources for a predetermined configurable period.

According to a further aspect of the present disclosure, the near field communication tag may enable short range communication between compatible devices.

According to another aspect of the present disclosure, the quick response code may be a two-dimensional barcode having black and white pixel patterns, and wherein the quick response code may have a predetermined expiration configurable time period.

According to yet another aspect of the present disclosure, the method may further include: determining a facial recognition error based on a negative facial recognition result; receiving user's domain credentials data to allow the user to manually log in to the application; comparing the user's domain credentials data to prestored user's credentials data by accessing a database that stores the user's credentials data; successfully login the user into the application based on a determination that the received user's domain credentials data matches the prestored user's credentials data.

According to an aspect of the present disclosure, the building may be the user's office building.

According to yet another aspect of the present disclosure, the user computing device may be one or more of the following devices: a tablet computer, a personal digital assistant, a mobile device, a communications device, a wireless smart phone, but the disclosure is not limited thereto.

According to a further aspect of the present disclosure, each of the quick response code and the near field communication tag may determine what level of access the user has to certain resources among the plurality of resources.

According to an aspect of the present disclosure, a system for accessing a plurality of resources with a single authentication pass is disclosed. The system may include: a processor; and a memory operatively connected to the processor via a communication interface, the memory storing computer readable instructions, when executed, may cause the processor to: access an application within a user computing device, the application being configured to authenticate a user based on a facial recognition protocol; successfully log in the user into the application based on a positive facial recognition result for gaining access to a building; generate, in response to successful login, a quick response code and a near field communication tag; transmit the quick response code and the near field communication tag to the user computing device; read the quick response code or the near field communication tag by a security system installed in an entry point to the building in response to bringing the user computing device close to the security system; authenticate the user based on successful reading of the quick response code or the near field communication tag; and configure the quick response code or the near field communication tag as a single authentication pass allowing the user to enter the building and access the plurality of resources for a predetermined configurable period.

According to a further aspect of the present disclosure, the processor may be further configured to: determine a facial recognition error based on a negative facial recognition result; receive user's domain credentials data to allow the user to manually log in to the application; compare the user's domain credentials data to prestored user's credentials data by accessing a database that stores the user's credentials data; successfully login the user into the application based on a determination that the received user's domain credentials data matches the prestored user's credentials data.

According to an aspect of the present disclosure, non-transitory computer readable medium configured to store instructions for accessing a plurality of resources with a single authentication pass is disclosed. The instructions, when executed, may cause a processor to perform the following: accessing an application within a user computing device, the application being configured to authenticate a user based on a facial recognition protocol; successfully logging in the user into the application based on a positive facial recognition result for gaining access to a building; generating, in response to successful login, a quick response code and a near field communication tag; transmitting the quick response code and the near field communication tag to the user computing device; reading the quick response code or the near field communication tag by a security system installed in an entry point to the building in response to bringing the user computing device close to the security system; authenticating the user based on successful reading of the quick response code or the near field communication tag; and configuring the quick response code or the near field communication tag as a single authentication pass allowing the user to enter the building and access the plurality of resources for a predetermined configurable period.

According to a further aspect of the present disclosure, the instructions, when executed, may further cause the processor to perform the following: determining a facial recognition error based on a negative facial recognition result; receiving user's domain credentials data to allow the user to manually log in to the application; comparing the user's domain credentials data to prestored user's credentials data by accessing a database that stores the user's credentials data; successfully login the user into the application based on a determination that the received user's domain credentials data matches the prestored user's credentials data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
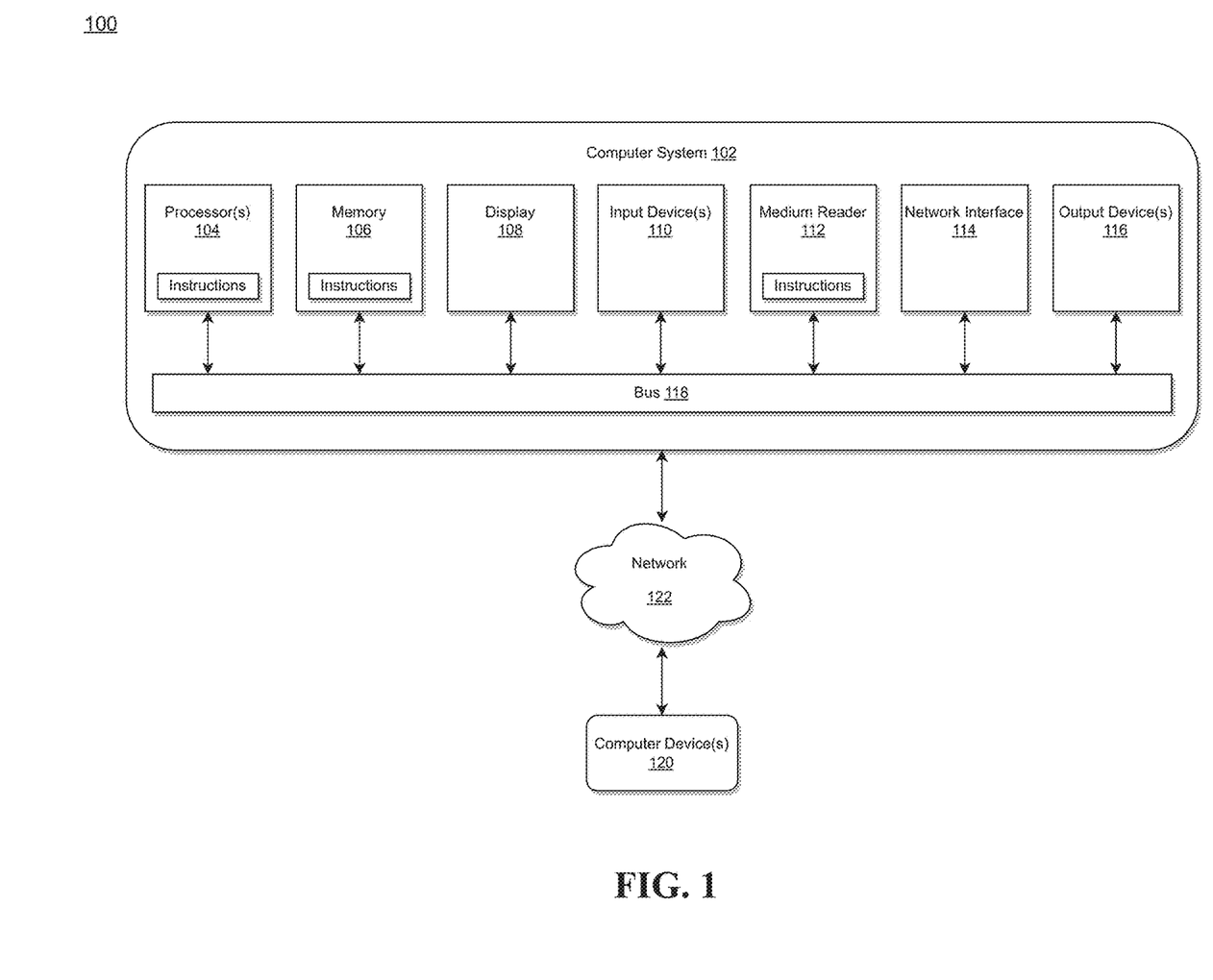
FIG. 1 illustrates a computer system for implementing a platform and language agnostic one authorization application module configured to authenticate users and grant authenticated users to access a plurality of resources by a single authentication in accordance with an exemplary embodiment.

FIG. 1 is an exemplary system for implementing a platform and language agnostic design one authorization application module configured to authenticate users and grant authenticated users to access a plurality of resources by a single authentication in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration-based languages.

Figure 2:
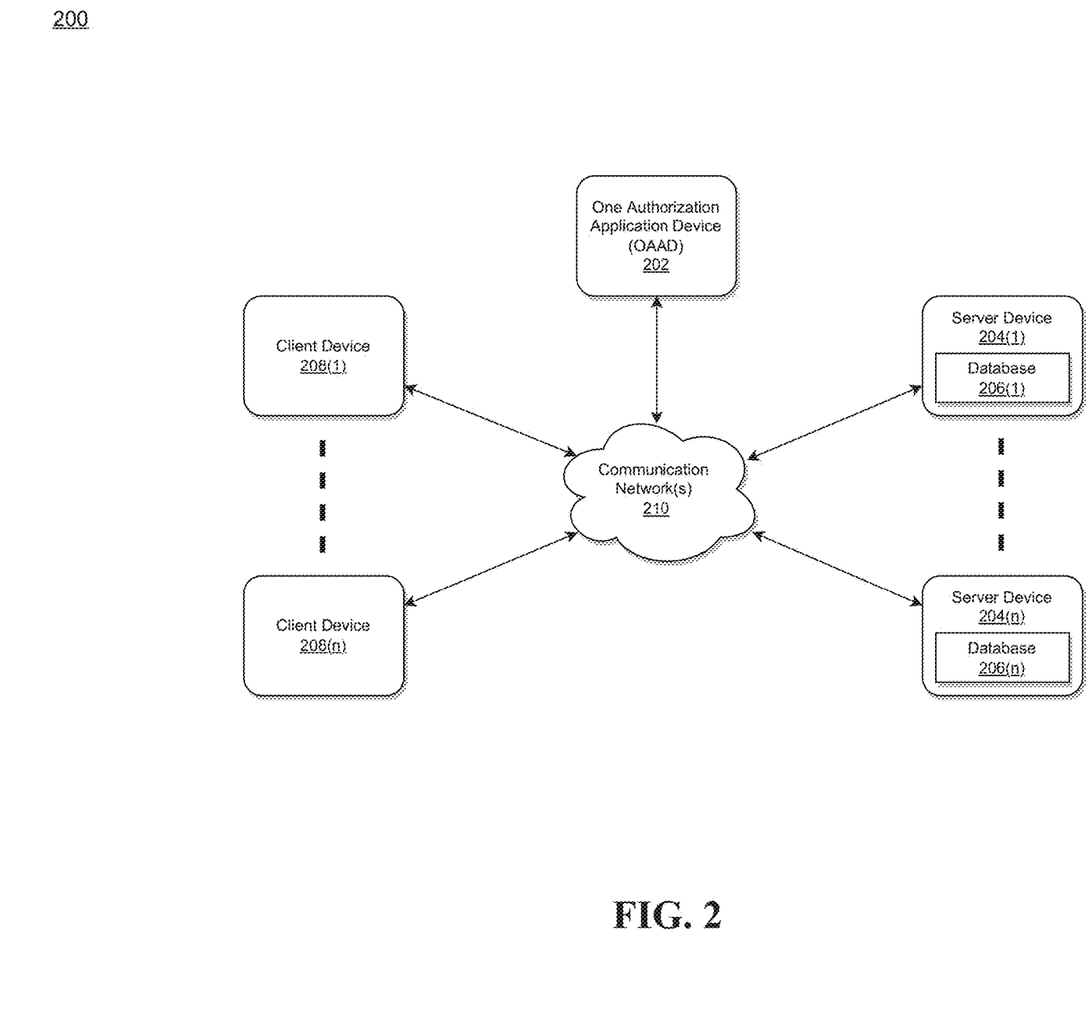
FIG. 2 illustrates an exemplary diagram of a network environment with a platform and language agnostic one authorization application device in accordance with an exemplary embodiment.

Referring to FIG. 2, a schematic of an exemplary network environment 200 for implementing a platform and language agnostic one authorization application device (OAAD) of the instant disclosure is illustrated.

According to exemplary embodiments, the above-described problems associated with conventional approach of multiple authentications may be overcome by implementing an OAAD 202 as illustrated in FIG. 2 that may implement a platform and language agnostic one authorization application module configured to automatically authenticate users in a secure manner that is reliable, easy to use; and allow authenticated users to access a plurality of resources by a single authentication where this type of security protocol is required, but the disclosure is not limited thereto.

According to exemplary embodiments, the OAAD 202 as illustrated in FIG. 2 that may implement a platform and language agnostic design system review module as disclosed herein may relate to a UI usage of UI frameworks, accessibility, and design system libraries for implementing an application utilizing advanced UI technologies and Web Content Accessibility Guidelines (WCAG) 2.1 accessibility baseline. The OAAD 202 as illustrated in FIG. 2 that may implement a platform and language agnostic design system review module as disclosed herein may also be configured to obtain feedback data regarding implementing a new application or feature enhancement into a current application, thereby improving functionality, consistency, efficiency (via support and maintenance) and accessibility of the application to its surrounding ecosystem, but the disclosure is not limited thereto.

The OAAD 202 may be the same or similar to the computer system 102 as described with respect to FIG. 1.

The OAAD 202 may store one or more applications that can include executable instructions that, when executed by the OAAD 202, cause the OAAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the OAAD 202 itself, may be located in virtual server(s) running in a cloud-based computing environment rather than being tied to one or more specific physical network computing devices.

Also, the application(s) may be running in one or more virtual machines (VMs) executing on the OAAD 202. Additionally, in one or more embodiments of this technology, virtual machine(s) running on the OAAD 202 may be managed or supervised by a hypervisor.

In the network environment 200 of FIG. 2, the OAAD 202 is coupled to a plurality of server devices 204(1)-204(n) that hosts a plurality of databases 206(1)-206(n), and also to a plurality of client devices 208(1)-208(n) via communication network(s) 210. A communication interface of the OAAD 202, such as the network interface 114 of the computer system 102 of FIG. 1, operatively couples and communicates between the OAAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the OAAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The OAAD 202 may be a standalone device or integrated with one or more other devices or apparatuses, such as one or more of the server devices 204(1)-204(n), for example. In one particular example, the OAAD 202 may be hosted by one of the server devices 204(1)-204(n), and other arrangements are also possible. Moreover, one or more of the devices of the OAAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the OAAD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the OAAD 202 that may efficiently provide a platform for implementing a platform and a language agnostic one authorization application module configured to automatically authenticate users in a secure manner that is reliable, easy to use; and allow authenticated users to access a plurality of resources by a single authentication where this type of security protocol is required, but the disclosure is not limited thereto.

The client devices 208(1)-208(n) may run interface applications, such as standard web browsers or standalone client applications, which may provide an interface to communicate with the OAAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the OAAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the OAAD 202, the server devices 204(1)-204(n), or the client devices 208(1)-208(n), for example, may be configured to operate as virtual instances on the same physical machine. For example, one or more of the OAAD 202, the server devices 204(1)-204(n), or the client devices 208(1)-208(n) may operate on the same physical device rather than as separate devices communicating through communication network(s) 210. Additionally, there may be more or fewer OAADs 202, server devices 204(1)-204(n), or client devices 208(1)-208(n) than illustrated in FIG. 2. According to exemplary embodiments, the OAAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
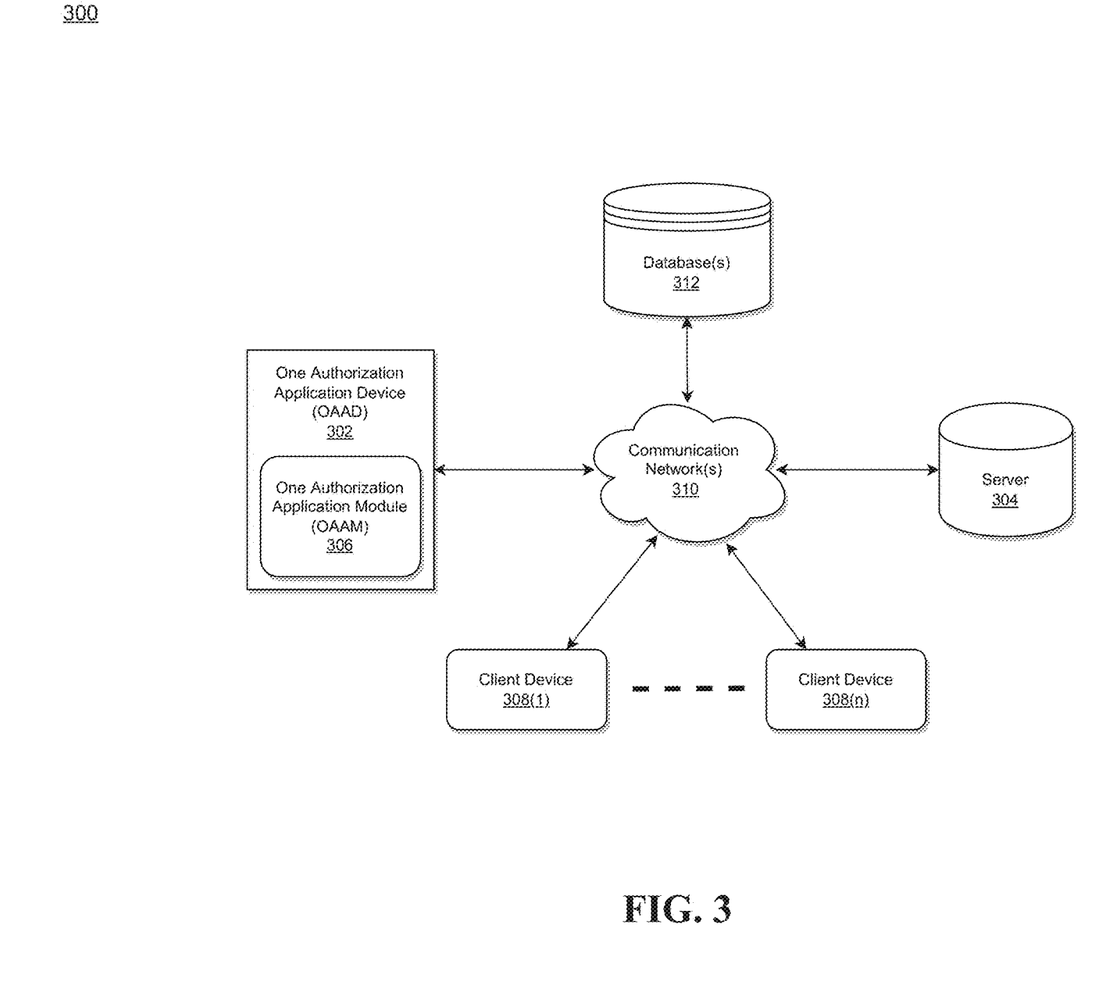
FIG. 3 illustrates a system diagram for implementing a platform and language agnostic one authorization application device having a platform and language agnostic one authorization application module in accordance with an exemplary embodiment.

FIG. 3 illustrates a system diagram for implementing a platform and language agnostic OAAD having a platform and language agnostic design one authorization application module (OAAM) in accordance with an exemplary embodiment.

As illustrated in FIG. 3, the system 300 may include an OAAD 302 within which an OAAM 306 is embedded, a server 304, a database(s) 312, a plurality of client devices 308(1) . . . 308(n), and a communication network 310.

According to exemplary embodiments, the OAAD 302 including the OAAM 306 may be connected to the server 304, and the database(s) 312 via the communication network 310. The OAAD 302 may also be connected to the plurality of client devices 308(1) . . . 308(n) via the communication network 310, but the disclosure is not limited thereto.

According to exemplary embodiment, the OAAD 302 is described and shown in FIG. 3 as including the OAAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may that may produce programming for searching, monitoring, and analyzing machine-generated data via a Web-style interface, etc., but the disclosure is not limited thereto.

According to exemplary embodiments, the OAAM 306 may be configured to receive real-time feed of data from the plurality of client devices 308(1) . . . 308(n) via the communication network 310.

As will be described below, the OAAM 306 may be configured to access an application within a user computing device (i.e., one of the client devices 308(1)-308(n)), the application being configured to authenticate a user based on a facial recognition protocol; successfully log in the user into the application based on a positive facial recognition result for gaining access to a building; generate, in response to successful login, a quick response code and a near field communication tag; transmit the quick response code and the near field communication tag to the user computing device; read the quick response code or the near field communication tag by a security system installed in an entry point to the building in response to bringing the user computing device close to the security system; authenticate the user based on successful reading of the quick response code or the near field communication tag; and configure the quick response code or the near field communication tag as a single authentication pass allowing the user to enter the building and access the plurality of resources for a predetermined configurable period, but the disclosure is not limited thereto.

The plurality of client devices 308(1) . . . 308(n) are illustrated as being in communication with the OAAD 302. In this regard, the plurality of client devices 308(1) . . . 308(n) may be "clients" of the OAAD 302 and are described herein as such. Nevertheless, it is to be known and understood that the plurality of client devices 308(1) . . . 308(n) need not necessarily be "clients" of the OAAD 302, or any entity described in association therewith herein. Any additional or alternative relationship may exist between either or both of the plurality of client devices 308(1) . . . 308(n) and the OAAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the OAAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The OAAD 302 may be the same or similar to the OAAD 202 as described with respect to FIG. 2, including any features or combination of features described with respect thereto.

Figure 4:
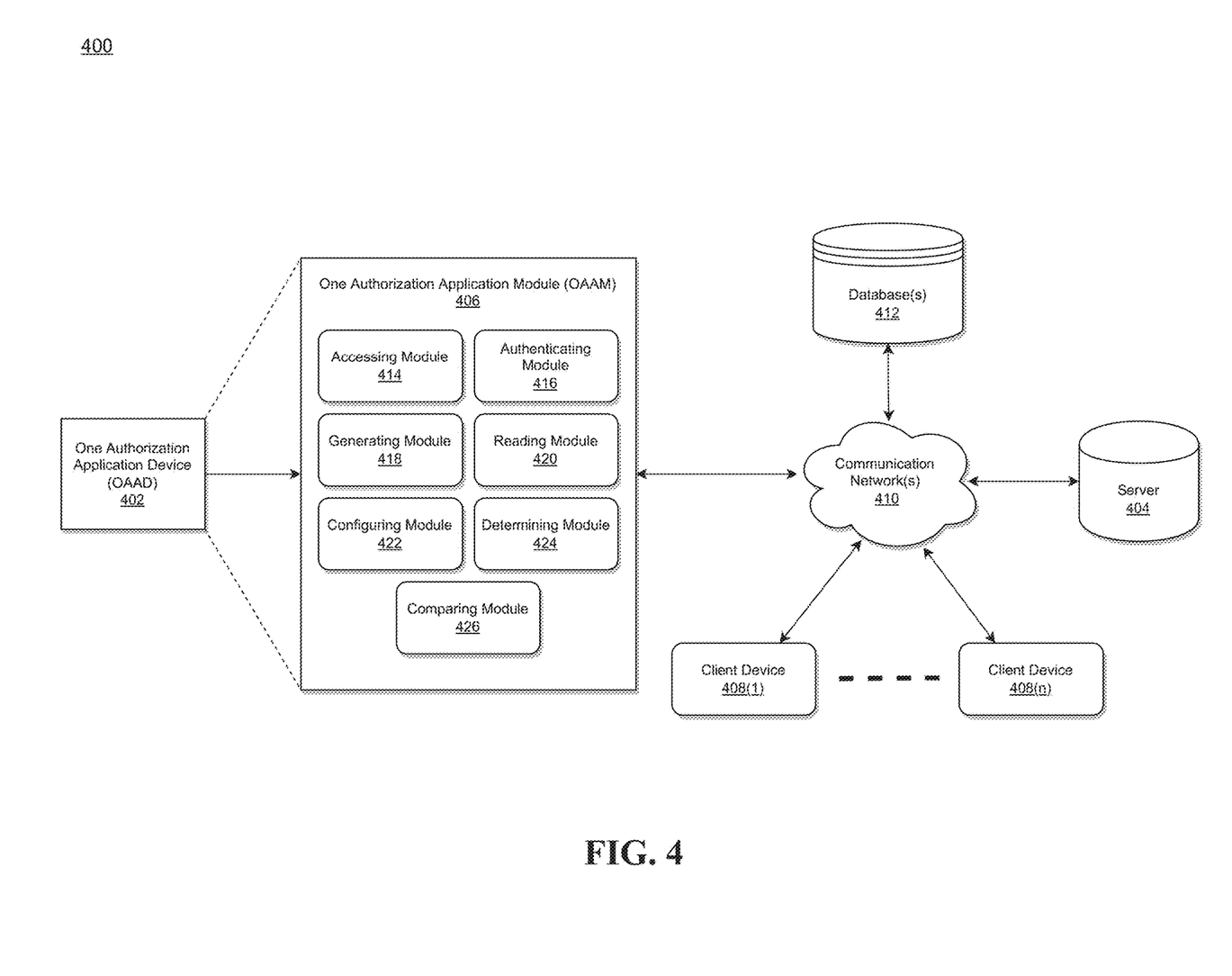
FIG. 4 illustrates a system diagram for implementing a platform and language agnostic one authorization application module of FIG. 3 in accordance with an exemplary embodiment.

FIG. 4 illustrates a system diagram for implementing a platform and language agnostic OAAM of FIG. 3 in accordance with an exemplary embodiment.

According to exemplary embodiments, the system 400 may include a platform and language agnostic OAAD 402 within which an OAAM 406 is embedded, a server 404, database(s) 412, a plurality of client devices 408(1)-408(n), and a communication network 410.

According to exemplary embodiments, the OAAD 402 including the OAAM 406 may be connected to the server 404 and the database(s) 412 via the communication network 410. The OAAD 402 may also be connected to the plurality of client devices 408(1)-408(n) via the communication network 410, but the disclosure is not limited thereto. The OAAM 406, the server 404, the plurality of client devices 408(1)-408(n), the database(s) 412, the communication network 410 as illustrated in FIG. 4 may be the same or similar to the OAAM 306, the server 304, the plurality of client devices 308(1)-308(n), the database(s) 312, the communication network 310, respectively, as illustrated in FIG. 3.

According to exemplary embodiments, as illustrated in FIG. 4, the OAAM 406 may include an accessing module 414, an authenticating module 416, a generating module 418, a reading module 420, a configuring module 422, a determining module 424, and a comparing module 426.

According to exemplary embodiments, various interactions and data exchange among the accessing module 414, authenticating module 416, generating module 418, reading module 420, configuring module 422, determining module 424, and the comparing module 426 of the OAAM 406 may authenticate users in a secure manner that is reliable, easy to use; and allow authenticated users to access a plurality of resources by a single authentication where this type of security protocol is required, as disclosed herein within the exemplary scope of the present invention, but the disclosure is not limited thereto. Functionalities associated with each module will be disclosed below with reference to FIGS. 5 and 6.

According to exemplary embodiments, each of the accessing module 414, authenticating module 416, generating module 418, reading module 420, configuring module 422, determining module 424, and the comparing module 426 of the OAAM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the accessing module 414, authenticating module 416, generating module 418, reading module 420, configuring module 422, determining module 424, and the comparing module 426 of the OAAM 406 may be implemented by microprocessors or similar, and may be programmed using software (e.g., microcode) to perform various functions discussed herein and may optionally be driven by firmware and/or software.

Alternatively, according to exemplary embodiments, each of the accessing module 414, authenticating module 416, generating module 418, reading module 420, configuring module 422, determining module 424, and the comparing module 426 of the OAAM 406 may be implemented by dedicated hardware, or as a combination of dedicated hardware to perform some functions and a processor (e.g., one or more programmed microprocessors and associated circuitry) to perform other functions.

According to exemplary embodiments, each of the accessing module 414, authenticating module 416, generating module 418, reading module 420, configuring module 422, determining module 424, and the comparing module 426 of the OAAM 406 may be called via corresponding API.

The process may be executed via a communication module (not shown) and the communication network 410, which may comprise plural networks as described above. For example, in an exemplary embodiment, the various components of the OAAM 406 may communicate with the server 404, and the database(s) 412 via the communication module and the communication network 410. Of course, these embodiments are merely exemplary and are not limiting or exhaustive.

According to exemplary embodiments, the communication network 410 and the communication module may be configured to establish a link between the database(s) 412, the client devices 408(1)-408(n) and the OAAM 406.

Figure 5:
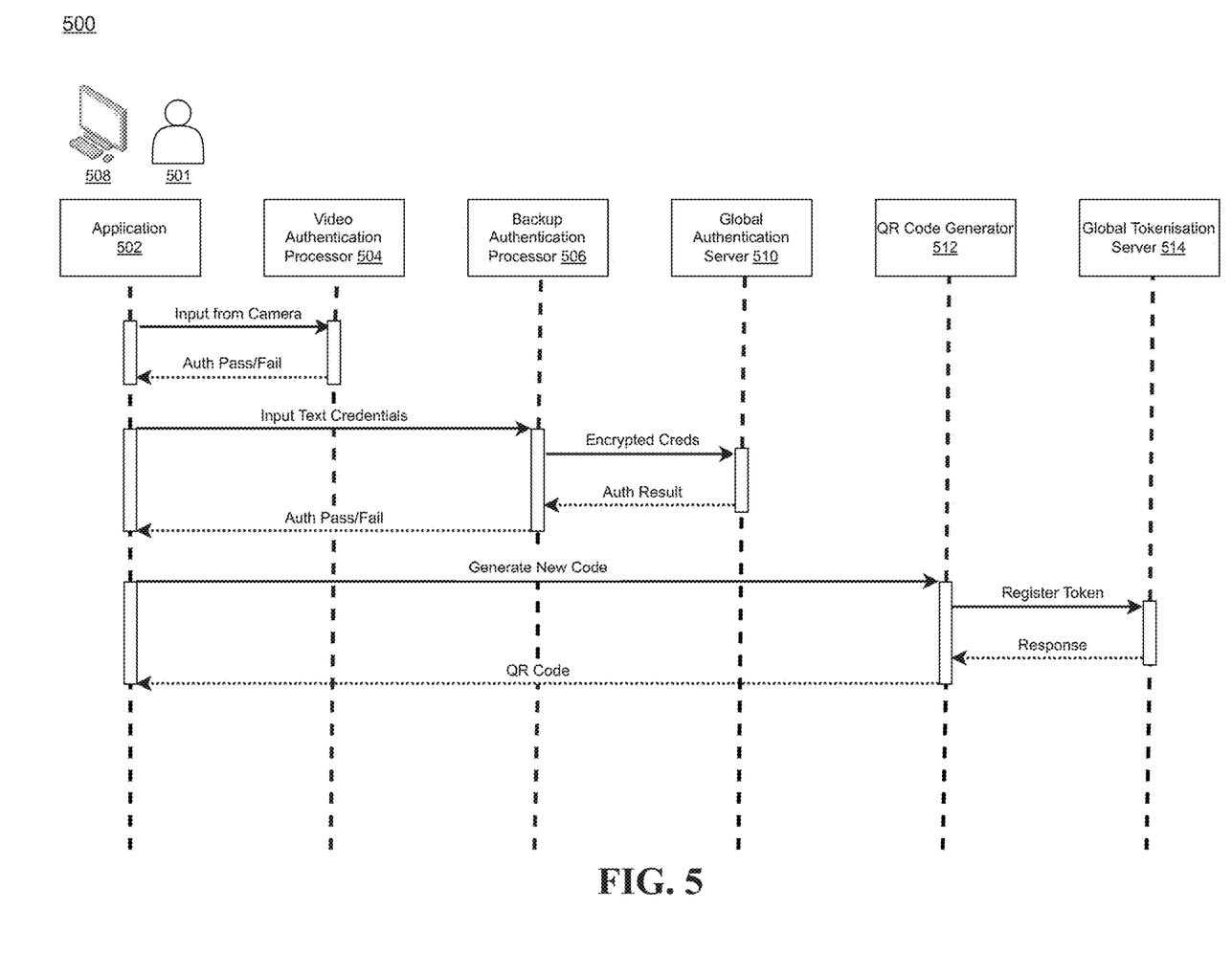
FIG. 5 illustrates an exemplary sequence diagram implemented by the platform and language agnostic one authorization application module of FIG. 4 for generating a quick response code and a near field communication tag in accordance with an exemplary embodiment.

FIG. 5 illustrates an exemplary sequence diagram 500 implemented by the platform and language agnostic OAAM 406 of FIG. 4 for generating a quick response code and a near field communication tag in accordance with an exemplary embodiment. According to the exemplary embodiment, the sequence diagram 500 may include an application 502 utilized by a user 501 via a computing device 508, a video authentication processor 504 for processing facial recognition algorithms, a backup authentication processor 506 acting as a backup processor when facial recognition fails, a global authentication server 510, quick response code generator 512, and a global tokenization server 514, but the disclosure is not limited thereto.

Figure 6:
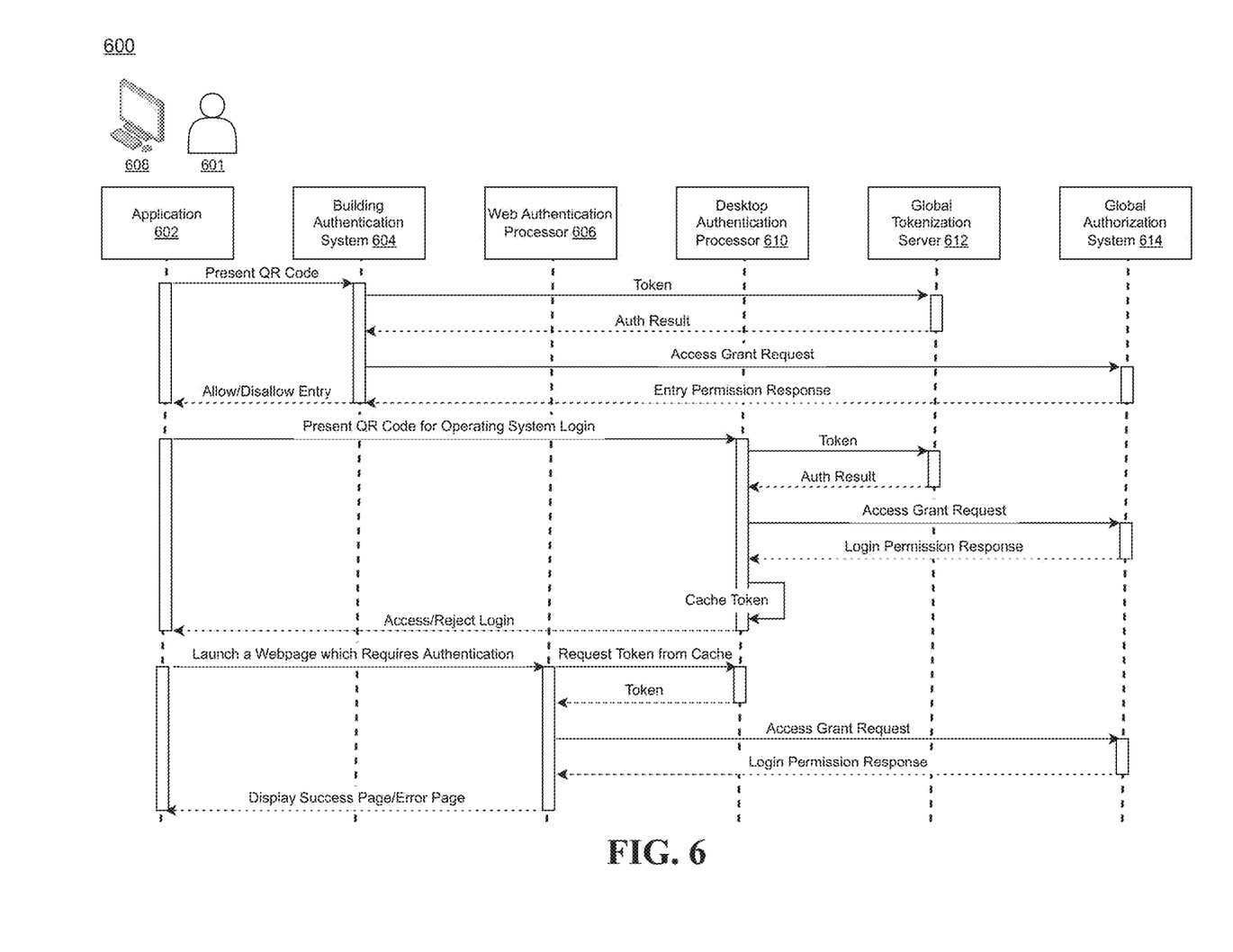
FIG. 6 illustrates an exemplary code usage sequence diagram implemented by the platform and language agnostic one authorization application module of FIG. 4 in accordance with an exemplary embodiment.

FIG. 6 illustrates an exemplary code usage sequence diagram 600 implemented by the platform and language agnostic OAAM 406 of FIG. 4 in accordance with an exemplary embodiment. According to the exemplary embodiment, the code usage sequence diagram 600 may include an application 602 utilized by a user 601 via a computing device 608, a building authentication system 604, a web authentication processor 606, a desktop authentication processor 610, a global tokenization server 612, and a global authorization system 614, but the disclosure is not limited thereto.

The following description may refer to components illustrated in FIGS. 4-6.

For example, according to exemplary embodiments, the accessing module 414 may be configured to access an application 502, 602 within a user computing device 508, 608, the application 502, 602 being configured to authenticate a user 501, 601 based on a facial recognition protocol implemented by the video authentication processor 504. For example, input data corresponding to user's 501, 601 facial data can be received by the video authentication processor 504 from the application 502, 602. Based on positive/negative match of the facial data, the video authentication processor 504 may outputs authentication pass/fail data to the application 502, 602.

According to exemplary embodiments, the authenticating module 416 may be configured to successfully log in the user 501, 601 into the application 502, 602 based on a positive facial recognition result received from the video authentication processor 504. According to exemplary embodiments, the authentication pass/fail data received from the video authentication processor 504 may also be utilized in determining whether the user 501, 601 can gain access to a building.

According to exemplary embodiments, the generating module 418 implemented by the QR code generator 512 may be configured to generate, in response to successful login, a quick response code and a near field communication tag and transmit the quick response code and the near field communication tag to the user computing device 508, 608.

According to exemplary embodiments, the reading module 420 may be configured to cause a security system (i.e., building authentication system 604), installed in an entry point to the building, to read the quick response code or the near field communication tag in response to bringing the user computing device 508, 608 close (i.e., within a configured distance) to the security system. The authenticating module 416 may be configured to authenticate the user 501, 601 based on successful reading of the quick response code or the near field communication tag.

According to exemplary embodiments, the configuring module 422 may configure the quick response code or the near field communication tag as a single authentication pass allowing the user 501, 601 to enter the building and access the plurality of resources for a predetermined configurable period. According to exemplary embodiments, the single authentication pass may be registered as a token onto the global tokenization server 514, 612.

According to exemplary embodiments, the near field communication tag may enable short range communication between compatible devices, i.e., the user computing device 508, 608, video authentication processor 504, building authentication system 604, web authentication processor 606, desktop authentication processor 610, etc.

According to exemplary embodiments, the quick response code may be a two-dimensional barcode having black and white pixel patterns, and wherein the quick response code may have a predetermined expiration configurable time period.

According to exemplary embodiments, the determining module 424 may employ the video authentication processor 504 which may be configured to determine a facial recognition error based on a negative facial recognition result. In response, the backup authentication processor 506 may receive user's domain credentials data to allow the user 501, 601 to manually log in to the application 502, 602. The comparing module 426 may be configured to compare the user's domain credentials data to prestored user's credentials data by accessing the global authentication server 510 that receives encrypted user's domain credentials data from the backup authentication processor 506. Alternatively, the database(s) 412 may pre-store the user's credentials data and the comparing module 426 may be configured to compare the user's domain credentials data to the prestored user's credentials data by accessing the database(s) 412, but the disclosure is not limited thereto. The OAAM 406 may successfully login the user 501, 601 into the application 502, 602 based on a determination that the received user's domain credentials data matches the prestored user's credentials data.

According to exemplary embodiments, the building may be the user's 501, 601 office building.

According to exemplary embodiments, the user computing device 508, 608 may be one or more of the following devices: a tablet computer, a personal digital assistant, a mobile device, a communications device, a wireless smart phone, but the disclosure is not limited thereto.

According to exemplary embodiments, each of the quick response (QR) code and the near field communication (NFC) tag may determine what level of access the user 501, 601 has to certain resources among the plurality of resources.

According to exemplary embodiments, how the QR code (or similarly NFC) can be utilized is illustrated in the sequence diagram 600 of FIG. 6.

For example, upon receiving the QR code, the user 601 may present the QR code to the building authentication system 604. In response to receiving the QR code, the building authentication system 604 sends a request with a token to the global tokenization server 612 which sends back an authentication result to the building authentication system 604. Based on the authentication result, the building authentication system 604 sends access grant request to the global authorization system 614 which sends base entry permission response to the building authentication system 604. If the entry permission response received by the building authentication system 604 indicates that authentication is successful, the building authentication system 604 grants the user 601 entry to the building. If the entry permission response received by the building authentication system 604 indicates that authentication is not successful, the building authentication system 604 denies the user 601 entry to the building.

According to exemplary embodiments, upon entering the building, the user 601 may present the QR code to the desktop authentication processor 610 for operating system login. The desktop authentication processor 610 sends the token to the global tokenization server 612 for verification. The global tokenization server 612 sends back authentication results to the desktop authentication processor 610 based on verification. The desktop authentication processor 610 then sends am access grant request to the global authorization system 614 which sends back login permission response to the desktop authentication processor 610. The desktop authentication processor 610 then sends access/reject login to the application 602. The token can be cached onto the desktop authentication processor 610.

According to exemplary embodiments, upon entering the building, the user 601 may launch a Webpage which requires authentication. Thus, upon receiving a request for launching the Webpage, the application 602 may send a request to the web authentication processor 606. The web authentication processor 606 then requests the token from the cache. Upon receiving the token, the web authentication processor 606 then sends an access grant request to the global authorization system 614 which sends back login permission response to the web authentication processor 606. In response, the application 602 displays success page if login permission is granted upon successful verification of the token or error page if login permission is not granted upon unsuccessful verification of the token.

Besides the Webpage launch or the operating system access, the QR code utilization sequence diagram 600 can applied to gain access to other resources by a single authentication token/pass where this type of security protocol is required as disclosed herein.

Figure 7:
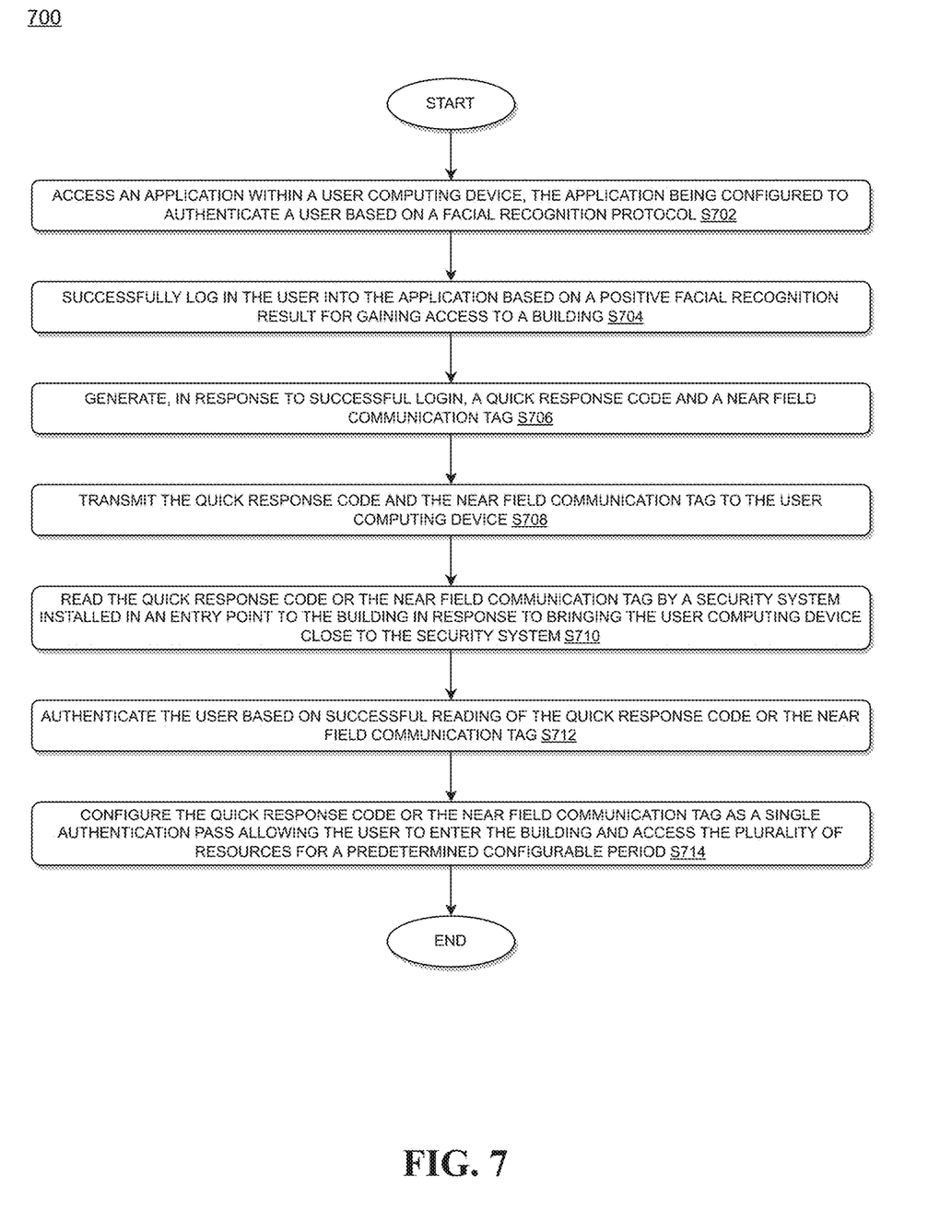
FIG. 7 illustrates a flow chart implemented by the platform and language agnostic one authorization application module of FIG. 4 for authenticating users and granting authenticated users to access a plurality of resources by a single authentication in accordance with an exemplary embodiment.

FIG. 7 illustrates a flow chart 700 implemented by the platform and language agnostic OAAM 406 of FIG. 4 for automatically authenticating users and granting authenticated users to access a plurality of resources by a single authentication in accordance with an exemplary embodiment. It will be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include accessing an application within a user computing device, the application being configured to authenticate a user based on a facial recognition protocol.

At step S704, the process 700 may include successfully logging in the user into the application based on a positive facial recognition result for gaining access to a building.

At step S706, the process 700 may include generating, in response to successful login, a quick response code and a near field communication tag.

At step S708, the process 700 may include transmitting the quick response code and the near field communication tag to the user computing device.

At step S710, the process 700 may include reading the quick response code or the near field communication tag by a security system installed in an entry point to the building in response to bringing the user computing device close to the security system.

At step S712, the process 700 may include authenticating the user based on successful reading of the quick response code or the near field communication tag.

At step S714, the process 700 may include configuring the quick response code or the near field communication tag as a single authentication pass allowing the user to enter the building and access the plurality of resources for a predetermined configurable period.

According to exemplary embodiments, the process 700 may further include: determining a facial recognition error based on a negative facial recognition result; receiving user's domain credentials data to allow the user to manually log in to the application; comparing the user's domain credentials data to prestored user's credentials data by accessing a database that stores the user's credentials data; successfully login the user into the application based on a determination that the received user's domain credentials data matches the prestored user's credentials data.

According to exemplary embodiments, the OAAD 402 may include a memory (e.g., a memory 106 as illustrated in FIG. 1) which may be a non-transitory computer readable medium that may be configured to store instructions for implementing a OAAM 406 for automatically authenticating users in a secure manner and allowing authenticated users to access a plurality of resources by a single authentication where this type of security protocol is required as disclosed herein. The OAAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the OAAM 406 or within the OAAD 402, may be used to perform one or more of the methods and processes as described herein. In a particular embodiment, the instructions may reside completely, or at least partially, within the memory 106, the medium reader 112, and/or the processor 104 (see FIG. 1) during execution by the OAAD 402.

According to exemplary embodiments, the instructions, when executed, may cause a processor 104 embedded within the OAAM 406 or the OAAD 402 to perform the following: accessing an application within a user computing device, the application being configured to authenticate a user based on a facial recognition protocol; successfully logging in the user into the application based on a positive facial recognition result for gaining access to a building; generating, in response to successful login, a quick response code and a near field communication tag; transmitting the quick response code and the near field communication tag to the user computing device; reading the quick response code or the near field communication tag by a security system installed in an entry point to the building in response to bringing the user computing device close to the security system; authenticating the user based on successful reading of the quick response code or the near field communication tag; and configuring the quick response code or the near field communication tag as a single authentication pass allowing the user to enter the building and access the plurality of resources for a predetermined configurable period.

According to exemplary embodiments, the instructions, when executed, may further cause the processor 104 to perform the following: determining a facial recognition error based on a negative facial recognition result; receiving user's domain credentials data to allow the user to manually log in to the application; comparing the user's domain credentials data to prestored user's credentials data by accessing a database that stores the user's credentials data; successfully login the user into the application based on a determination that the received user's domain credentials data matches the prestored user's credentials data.

According to exemplary embodiments, cameras (i.e., installed on the video authentication processor 504 or the building authentication system 604) at the building entrance or on the user's desktop as disclosed herein can also check the user's body temperature and deny login based on the temperature exceeding a certain threshold, for health safety reasons such as a COVID infection.

According to exemplary embodiments, all employees' facial images can be stored onto a database (e.g., database(s) 312, 412). The OAAM 406 and can use those facial images along with user's phone. This will be helpful for example, if a phone is out of battery or does not have a network connection. The contingency is to use user/password to access the OAAM 406.

According to exemplary embodiments as disclosed above in FIGS. 1-7, technical improvements effected by the instant disclosure may include a platform for implementing a platform and language agnostic one authorization application module configured to authenticate users in a secure manner that is reliable, easy to use; and allow authenticated users to access a plurality of resources by a single authentication where this type of security protocol is required, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for accessing a plurality of resources with a single authentication pass by utilizing one or more processors along with allocated memory, the method comprising:

implementing a platform and language agnostic one authorization application module (OAAM) configured to allow an authenticated user to access a plurality of resources by a single authentication, the OAAM including an accessing module, generating module, reading module, authenticating module, and a configuring module, wherein each module being called via a corresponding Application Programming Interface (API);

accessing an application within a user computing device, the application being configured to authenticate a user based on a facial recognition protocol by calling the accessing module via a first API;

successfully logging in, via the OAAM, the user into the application based on a positive facial recognition result for gaining access to a building;

generating, in response to successful login, a quick response code and a near field communication tag by calling the generating module via a second API;

transmitting the quick response code and the near field communication tag to the user computing device by calling the generating module via the second API;

reading the quick response code or the near field communication tag by a security system installed in an entry point to the building in response to bringing the user computing device close to the security system by calling the reading module via a third API;

authenticating the user based on successful reading of the quick response code or the near field communication tag by calling the authenticating module via a fourth API; and configuring the quick response code or the near field communication tag as a single authentication pass allowing the user to enter the building and access the plurality of resources for a predetermined configurable period by calling the configuring module via a fifth API.

2. The method according to claim 1, wherein the near field communication tag enables short range communication between compatible devices.

3. The method according to claim 1, wherein the quick response code is a two-dimensional barcode having black and white pixel patterns, and wherein the quick response code has a predetermined expiration configurable time period.

4. The method according to claim 1, further comprising:
determining a facial recognition error based on a negative facial recognition result;
receiving user's domain credentials data to allow the user to manually log in to the application;
comparing the user's domain credentials data to prestored user's credentials data by accessing a database that stores the user's credentials data;
successfully login the user into the application based on a determination that the received user's domain credentials data matches the prestored user's credentials data.

5. The method according to claim 1, wherein the building is the user's office building.

6. The method according to claim 1, wherein the user computing device is one or more of the following devices: a tablet computer, a personal digital assistant, a mobile device, a communications device, a wireless smart phone.

7. The method according to claim 1, wherein each of the quick response code and the near field communication tag determines what level of access the user has to certain resources among the plurality of resources.

8. A system for accessing a plurality of resources with a single authentication pass, the system comprising:
- a processor; and
- a memory operatively connected to the processor via a communication interface, the memory storing computer readable instructions, when executed, causes the processor to:
- implement a platform and language agnostic one authorization application module (OAAM) configured to allow an authenticated user to access a plurality of resources by a single authentication, the OAAM including an accessing module, generating module, reading module, authenticating module, and a configuring module, wherein each module being called via a corresponding Application Programming Interface (API);
- access an application within a user computing device, the application being configured to authenticate a user based on a facial recognition protocol by calling the accessing module via a first API;
- successfully log in, via the OAAM, the user into the application based on a positive facial recognition result for gaining access to a building;
- generate, in response to successful login, a quick response code and a near field communication tag by calling the generating module via a second API;
- transmit the quick response code and the near field communication tag to the user computing device by calling the generating module via the second API;
- read the quick response code or the near field communication tag by a security system installed in an entry point to the building in response to bringing the user computing device close to the security system by calling the reading module via a third API;
- authenticate the user based on successful reading of the quick response code or the near field communication tag by calling the authenticating module via a fourth API; and
- configure the quick response code or the near field communication tag as a single authentication pass allowing the user to enter the building and access the plurality of resources for a predetermined configurable period by calling the configuring module via a fifth API.

9. The system according to claim 8, wherein the near field communication tag enables short range communication between compatible devices.

10. The system according to claim 8, wherein the quick response code is a two-dimensional barcode having black and white pixel patterns, and wherein the quick response code has a predetermined expiration configurable time period.

11. The system according to claim 8, wherein the processor is further configured to:
- determine a facial recognition error based on a negative facial recognition result;
- receive user's domain credentials data to allow the user to manually log in to the application;
- compare the user's domain credentials data to prestored user's credentials data by accessing a database that stores the user's credentials data;
- successfully login the user into the application based on a determination that the received user's domain credentials data matches the prestored user's credentials data.

12. The system according to claim 8, wherein the building is the user's office building.

13. The system according to claim 8, wherein the user computing device is one or more of the following devices: a tablet computer, a personal digital assistant, a mobile device, a communications device, a wireless smart phone.

14. The system according to claim 8, wherein each of the quick response code and the near field communication tag determines what level of access the user has to certain resources among the plurality of resources.

15. A non-transitory computer readable medium configured to store instructions for accessing a plurality of resources with a single authentication, the instructions cause a processor to perform the following:
- implementing a platform and language agnostic one authorization application module (OAAM) configured to allow an authenticated user to access a plurality of resources by a single authentication, the OAAM including an accessing module, generating module, reading module, authenticating module, and a configuring module, wherein each module being called via a corresponding Application Programming Interface (API);
- accessing an application within a user computing device, the application being configured to authenticate a user based on a facial recognition protocol by calling the accessing module via a first API;
- successfully logging in, via the OAAM, the user into the application based on a positive facial recognition result for gaining access to a building;
- generating, in response to successful login, a quick response code and a near field communication tag by calling the generating module via a second API;
- transmitting the quick response code and the near field communication tag to the user computing device by calling the generating module via the second API;
- reading the quick response code or the near field communication tag by a security system installed in an entry point to the building in response to bringing the user computing device close to the security system by calling the reading module via a third API;
- authenticating the user based on successful reading of the quick response code or the near field communication tag by calling the authenticating module via a fourth API; and
- configuring the quick response code or the near field communication tag as a single authentication pass allowing the user to enter the building and access the plurality of resources for a predetermined configurable period by calling the configuring module via a fifth API.

16. The non-transitory computer readable medium according to claim 15, wherein the near field communication tag enables short range communication between compatible devices, and wherein each of the quick response code and the near field communication tag determines what level of access the user has to certain resources among the plurality of resources.

17. The non-transitory computer readable medium according to claim 15, wherein the quick response code is a two-dimensional barcode having black and white pixel patterns, and wherein the quick response code has a predetermined expiration configurable time period.

18. The non-transitory computer readable medium according to claim 15, wherein the instructions, when executed, cause the processor to further perform the following:
- determining a facial recognition error based on a negative facial recognition result;
- receiving user's domain credentials data to allow the user to manually log in to the application;

comparing the user's domain credentials data to prestored user's credentials data by accessing a database that stores the user's credentials data;

successfully login the user into the application based on a determination that the received user's domain credentials data matches the prestored user's credentials data.

19. The non-transitory computer readable medium according to claim 15, wherein the building is the user's office building.

20. The non-transitory computer readable medium according to claim 15, wherein the user computing device is one or more of the following devices: a tablet computer, a personal digital assistant, a mobile device, a communications device, a wireless smart phone.

* * * * *